(12) United States Patent
Aumann et al.

(10) Patent No.: US 9,499,357 B2
(45) Date of Patent: Nov. 22, 2016

(54) CONVEYING DEVICE FOR CONVEYING PRODUCTS

(71) Applicant: Uhlmann Pac-Systeme GmbH & Co. KG, Laupheim (DE)

(72) Inventors: Thomas Aumann, Mietingen (DE); Mathias Wegerer, Erolzheim-Edelbeuren (DE); Wolfgang Rodi, Laupheim/Baustetten (DE); Daniel Zieher, Ummendorf (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 0 days.

(21) Appl. No.: 14/968,407

(22) Filed: Dec. 14, 2015

(65) Prior Publication Data

US 2016/0176658 A1    Jun. 23, 2016

(30) Foreign Application Priority Data

Dec. 17, 2014 (EP) ..................................... 14198640

(51) Int. Cl.
*B65G 54/02* (2006.01)

(52) U.S. Cl.
CPC ........... *B65G 54/02* (2013.01); *B65G 2207/08* (2013.01)

(58) Field of Classification Search
CPC ........................... B65G 54/02; B65G 2207/08
USPC .............................................. 198/419.3, 619
See application file for complete search history.

(56) References Cited

U.S. PATENT DOCUMENTS

| 4,867,579 | A | * | 9/1989 | Gallone | F16C 29/045 384/53 |
| 5,185,984 | A |   | 2/1993 | Tisma | |
| 6,722,836 | B2 | * | 4/2004 | Jager | B23Q 7/14 198/358 |
| 7,928,613 | B2 |   | 4/2011 | Jajtic et al. | |
| 8,827,071 | B2 | * | 9/2014 | van de Loecht | B65G 54/02 198/619 |

(Continued)

FOREIGN PATENT DOCUMENTS

| EP | 0989060 A2 | 3/2000 |
| EP | 2088664 A1 | 8/2009 |

(Continued)

OTHER PUBLICATIONS

European Search Report for EP 1498640.6 dated May 27, 2015.

*Primary Examiner* — Gene Crawford
*Assistant Examiner* — Keith R Campbell
(74) *Attorney, Agent, or Firm* — Brinks Gilson & Lione; Michael N. Spink

(57) ABSTRACT

The conveying device for conveying products comprises a plurality of slides individually movable with respect to each other for holding products and a guide rail, on which the slides are guided. A linear motor drive unit serves to drive the slides. The slides comprise a first subelement and a second subelement, each of the subelements comprising at least one permanent magnet, which interacts at least in certain sections of the guide rail with coils of the linear motor drive unit. The first and second subelements are connected to each other and are movable relative to each other in linear fashion.

20 Claims, 5 Drawing Sheets

(56) References Cited

U.S. PATENT DOCUMENTS

| | | | |
|---|---|---|---|
| 9,045,291 B2* | 6/2015 | Konrad | B65G 47/71 |
| 9,079,724 B2* | 7/2015 | van de Loecht | B65G 47/841 |
| 2004/0065057 A1 | 4/2004 | Momich | |
| 2005/0235612 A1 | 10/2005 | Momich | |
| 2013/0152516 A1* | 6/2013 | Sammons | B65B 9/087 |
| | | | 53/562 |
| 2013/0156177 A1 | 6/2013 | Theivendran et al. | |
| 2015/0027338 A1* | 1/2015 | Aumann | B65G 54/02 |
| | | | 104/290 |
| 2015/0151929 A1* | 6/2015 | Aumann | B65B 61/20 |
| | | | 198/803.3 |
| 2015/0158611 A1* | 6/2015 | Kalany | B65B 35/26 |
| | | | 53/443 |
| 2016/0031648 A1* | 2/2016 | Prussmeier | B65G 54/02 |
| | | | 104/107 |

FOREIGN PATENT DOCUMENTS

| | | |
|---|---|---|
| JP | H08 140331 A | 5/1996 |
| JP | 2001 057712 A | 2/2001 |
| WO | WO 2013/156177 A1 | 10/2013 |

* cited by examiner

CONVEYING DEVICE FOR CONVEYING PRODUCTS

RELATED APPLICATIONS

The present patent document claims the benefit of and priority to European Patent Application No. EP 14 198 640.6 filed Dec. 17, 2014, the entire contents of which are incorporated herein by reference.

FIELD AND BACKGROUND

The present disclosure relates to a conveying device for conveying products.

Among the uses of linear motor technology are transport systems comprising slides, which are movable individually with respect to each other. The slides are guided along a guide rail. The guide rail is usually configured as a stationary system in the form of an endless loop. The slides are driven in a transport direction by a linear drive. The linear drive comprises several coils, which, when electrically energized, build up an alternating magnetic field. Permanent magnets are mounted on the slides so that the slides can be driven. Because each coil can be supplied with current individually, each slide can be driven individually.

A transport device of this type is disclosed in, for example, WO 2013/156177 A1. The slide comprises substantially the shape of an inverted U with two legs, wherein the two legs are connected rigidly to each other. Permanent magnets, which interact with the coils of the linear drive unit, are arranged at the ends of the legs. The slide comprises a support surface, on which the products are arranged. The support surface is unchangeable, which makes it difficult, for example, to accommodate products of different sizes.

A transport device comprising several carrier elements is described in US 2004/0065057 A1 and US 2005/0235612 A1. The carrier elements comprise in turn side walls, which can be shifted relative to each other by mechanical means to adapt the carrier to products or different sizes or shapes.

Another adjustable carrier element is disclosed in EP 0 989 060 A2. The carrier element is guided on a conveying device and comprises a movable side wall and a fixed side wall. In a receiving position, the movable side wall is moved by mechanical means, so that the support surface of the carrier becomes larger.

SUMMARY

It is an object of the present disclosure to provide a conveying device for conveying products in which the size of the support surface of the slide can be quickly and easily increased or decreased.

According to an aspect of the disclosure, the conveying device for conveying products comprises one or a plurality of slides, which can be moved individually with respect to each other, for holding the products and a preferably stationary, endless guide rail, on which the at least one slide is guided. The conveying device also comprises a linear motor drive unit for driving the at least one slide. The at least one slide comprises a first subelement and a second subelement, which are connected to each other by at least one connecting element and which are movable relative to each other in linear fashion. Each of the two subelements comprises at least one permanent magnet, which interacts at least in certain sections of the guide rail with the coils of the linear motor drive unit.

The first subelement and the second subelement are movable individually with respect to each other and can therefore be adjusted quickly and easily with respect to each other. In this way, each slide can be adapted individually, without mechanical means, to the intended application, specifically to the shape and size of the product to be transported.

The first subelement may comprise guide elements, which rest on the guide rail, whereas the second subelement comprises no parts which rest on the guide rail. The second subelement is therefore not guided directly on the guide rail. The second subelement is moved automatically along with the first subelement when there is no interaction between the coils of the linear motor drive unit and the permanent magnets of the second subelement.

It is especially advantageous for the at least one connecting element to be connected rigidly to the first subelement. To this extent, the adjustment of the gap between the subelements is easily achieved by the relative movement of the second subelement.

The first and second subelements may be connected to the at least one connecting element in such a way that a tilting of the first and second subelements with respect to each other is prevented. As a result, the relative orientation of the retaining elements to each other is preserved at all times.

The at least one connecting element may serve as a linear guide for the second subelement. In this way, the second subelement can be pushed relative to the first subelement in a guided manner usually without the need for additional guide means.

The at least one connecting element may be a rod, on which the second subelement is slidingly supported. In this case, at least one through-opening may be present in the second subelement, and the at least one rod passes through this opening.

First and second subelements may be arranged in series in a direction parallel to a longitudinal center plane of the guide rail. Thus the relative movement of the two subelements takes place in the conveying direction of the device.

So that the products can be conveyed securely on the subelements, each of the first and second subelements preferably comprises a retaining element, so that the products can be held between the retaining elements.

The subelements may be movable relative to each other between a holding position, in which the retaining element of the first subelement and the retaining element of the second subelement are a first distance apart, and a feed or removal position, in which the retaining element of the first subelement and the retaining element of the second subelement are a second distance apart, which is greater than the first distance. In the feed or removal position, products can be easily introduced into, or removed from, the space between the retaining elements. Conversely, the products can be held securely between the retaining elements during transport, when the retaining elements are in the holding position.

The conveying device may also comprise a control unit, which is set up to activate the coils of the linear motor drive unit in such a way that the first and second subelements are shifted relative to each other. Thanks to this automatic control, the shifting of the two subelements relative to each other can be accomplished quickly and easily.

The slide may comprise a spring element, which is arranged in such a way that it pretensions the two subelements toward each other. This ensures that a certain force must be overcome when it is desired to move the two subelements apart. In addition, the second subelement is thus pressed close to the first subelement in the absence of any other effective force.

Finally, the first subelement may comprise a position detection element. Because the second subelement is connected to the first subelement, the second subelement does not require a position detection element.

DETAILED DESCRIPTION OF SPECIFIC EMBODIMENTS

Figure 1:
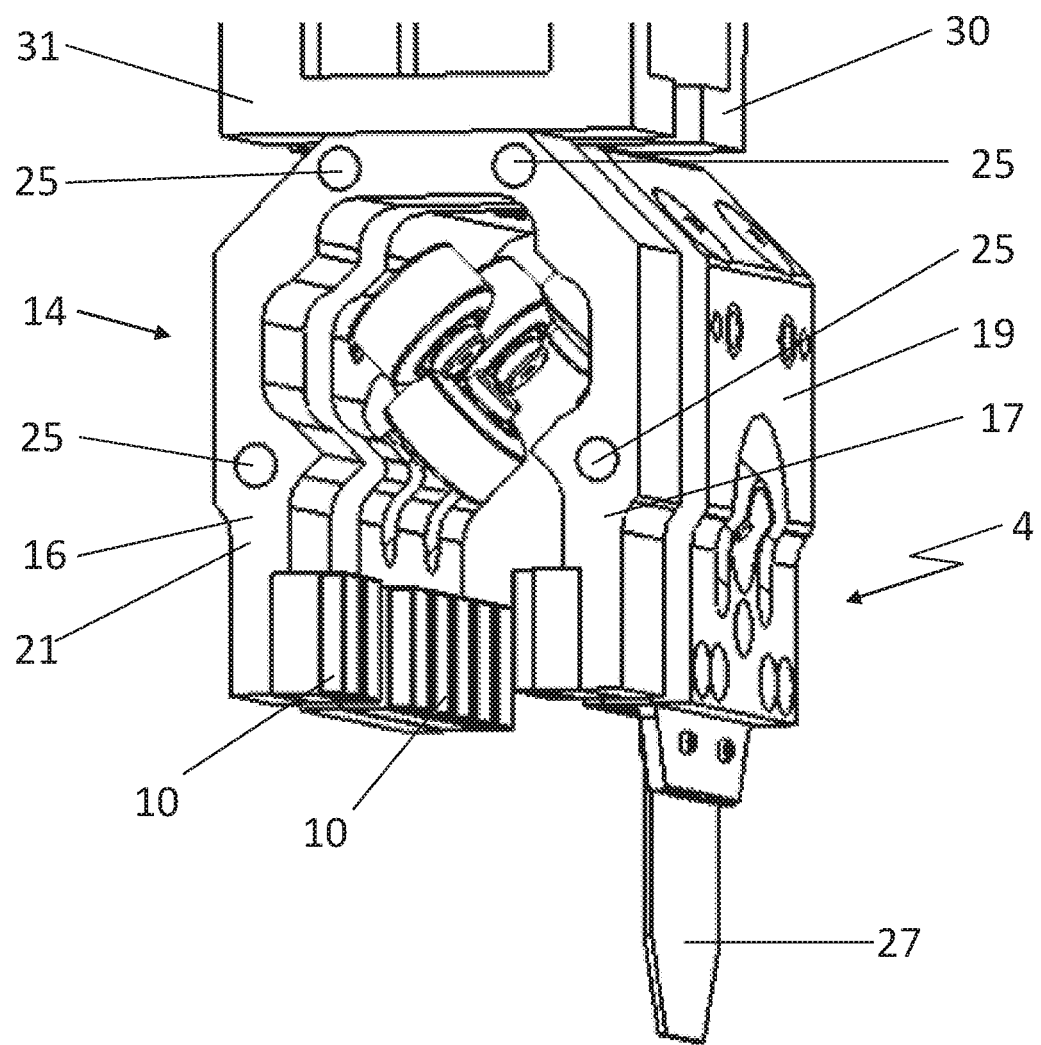
FIG. 1 shows a perspective view of one embodiment of a slide of a conveying device.
Figure 2:
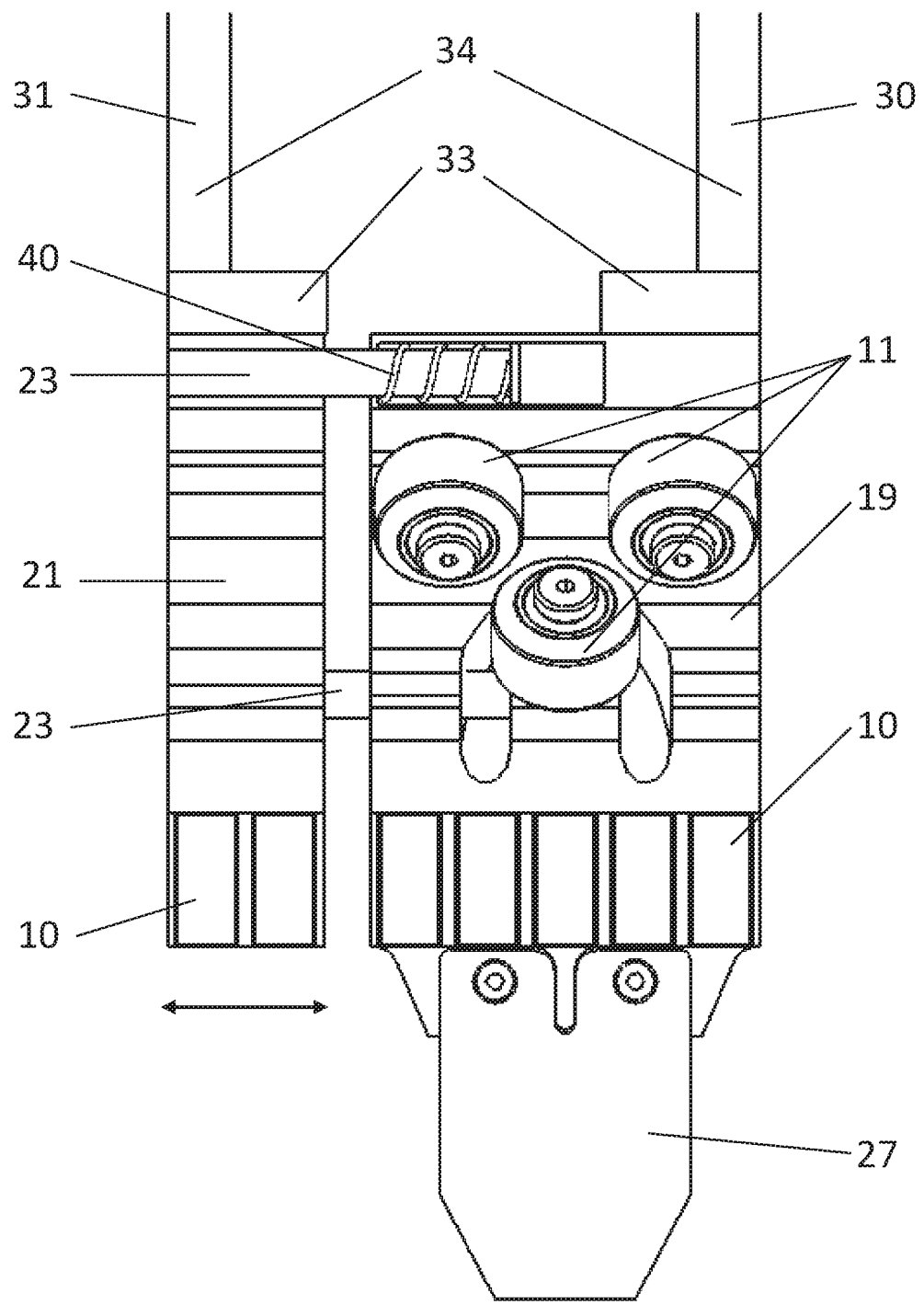
FIG. 2 shows a cross-sectional view of the slide of FIG. 1.
Figure 3:
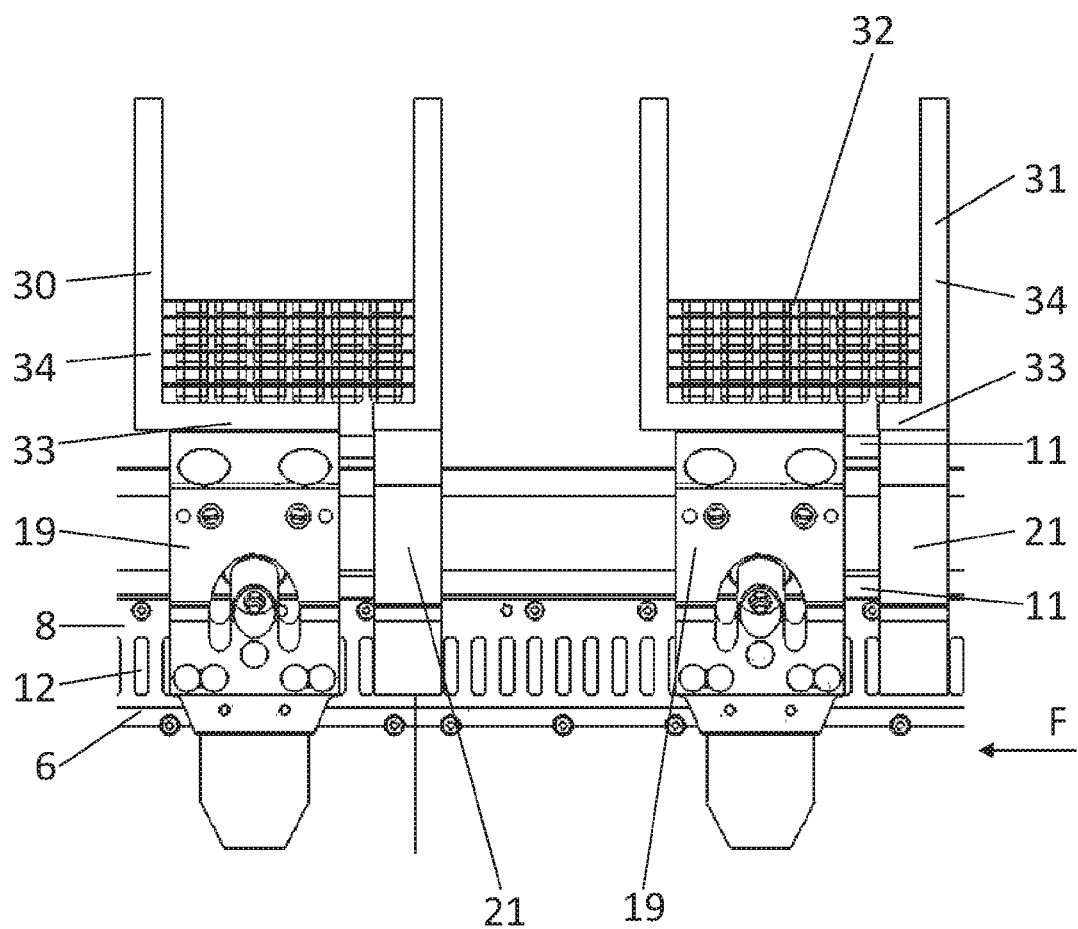
FIG. 3 shows a side view of another embodiment of a slide of a conveying device.
Figure 4:
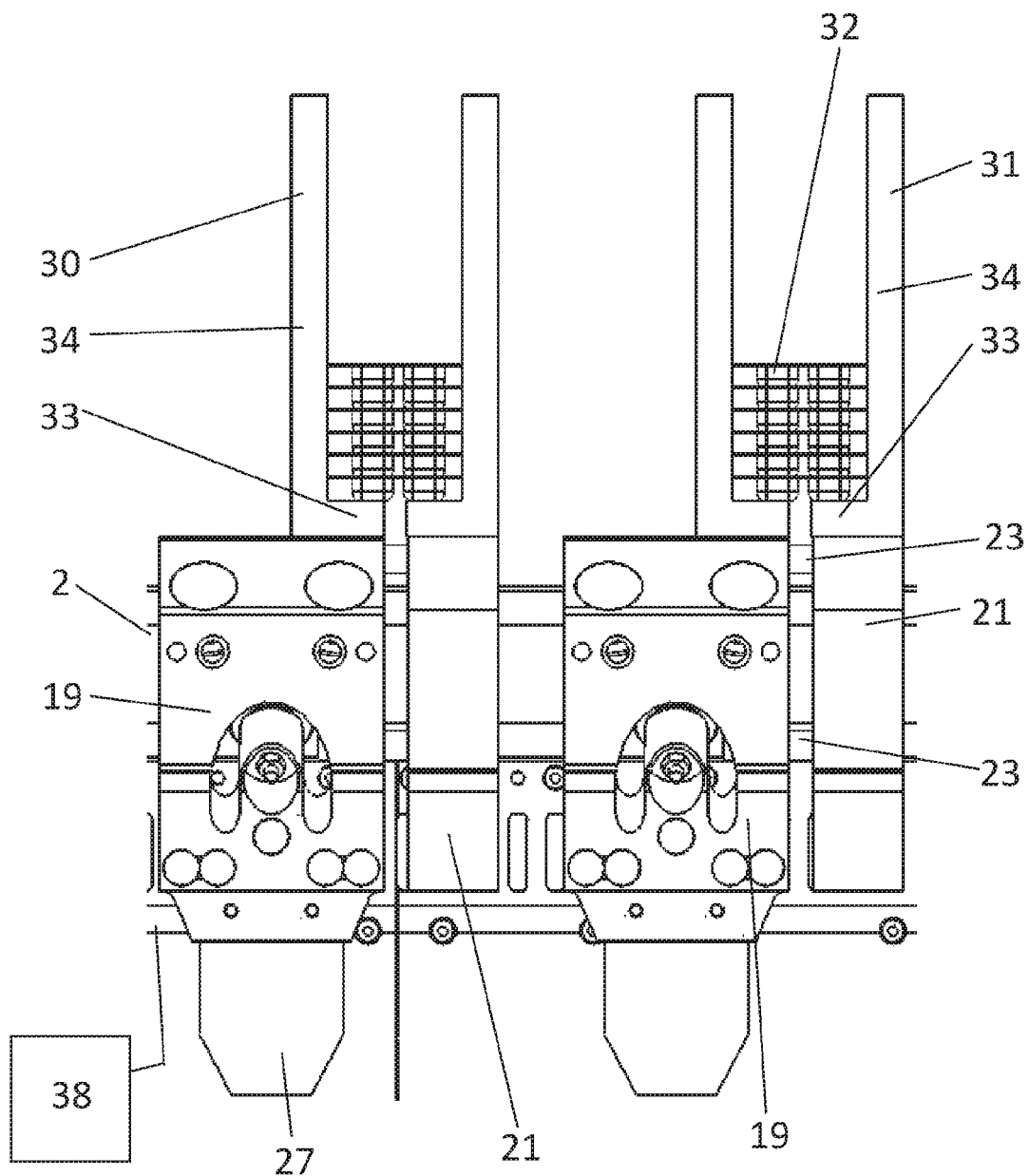
FIGS. 4 and 5 show side views of another embodiment of a slide of a conveying device with the subelements in two different positions.
Figure 5:
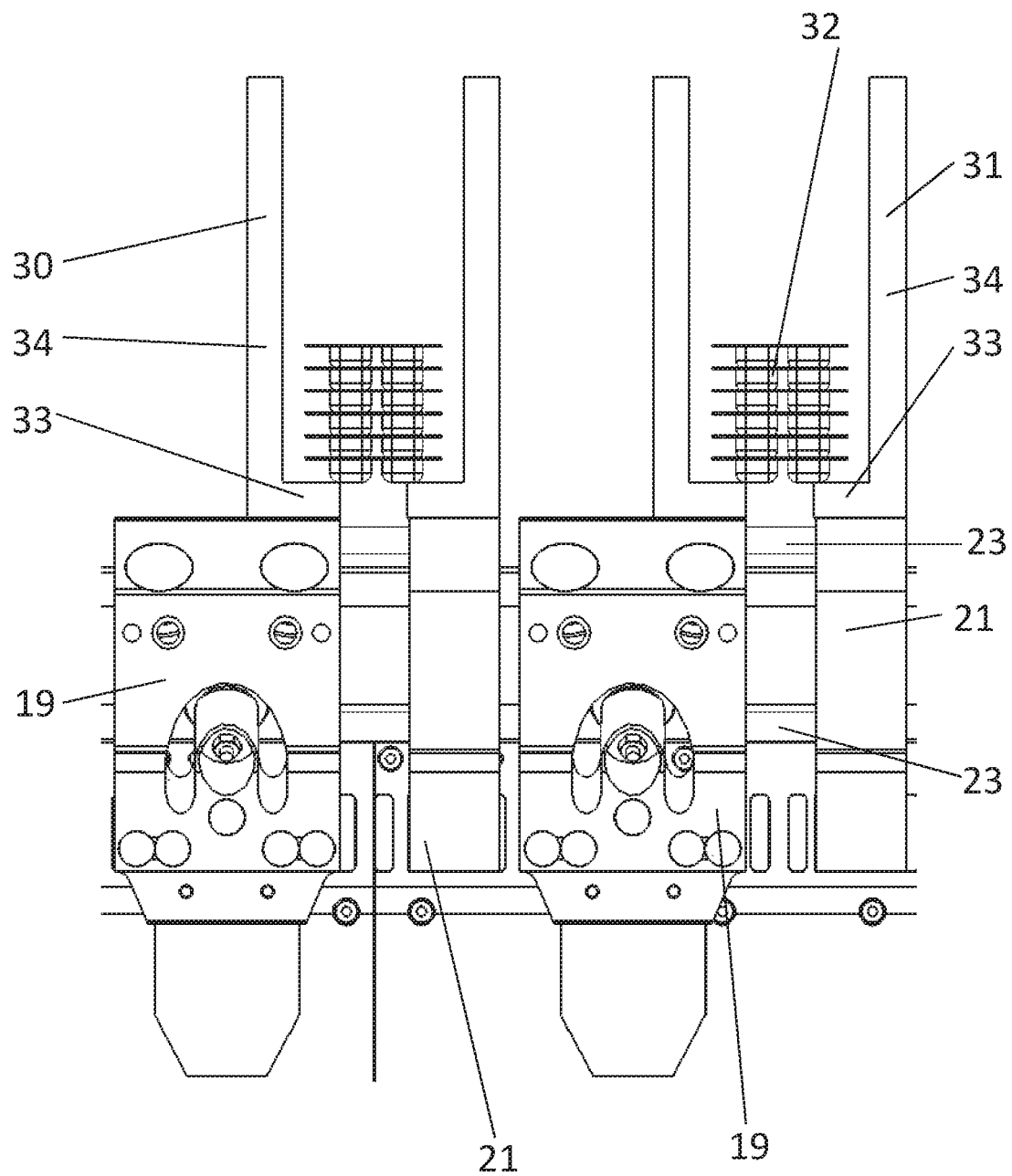

FIG. 1 shows one possibility for the basic structure of a slide 4 as part of a conveying device according to the present disclosure. As illustrated in FIGS. 3-5, the at least one slide 4 of the conveying device is supported on a preferably stationary and preferably endless guide rail 2 and is moved along the guide rail 2 to convey a product 32. In the exemplary embodiments, the products 32 are in the form of blister packs or stacks of blister packs. The present disclosure is applicable, however, to any other possible product form. Even though only one slide 4 can be present, usually several slides 4 will be traveling along the same guide rail 2 simultaneously. The material of the guide rail 2 and of the slides 4 is preferably aluminum.

The at least one slide 4 is moved along the guide rail 2 in a conveying direction F (see FIG. 3). In FIG. 3, a straight section of the guide rail 2 is shown, and the conveying direction F extends in a straight line from right to left. The conveying direction F, however, can also proceed in the opposite direction. A variable conveying direction F is also conceivable, when the at least one slide 4 follows a path with curved sections. The slide 4 can thus execute movement both in a straight line and around curves. By combining straight sections and curved sections, pathways of virtually any desired shape in a plane can be realized. Many different embodiments are possible here.

A linear motor drive unit 6, which is usually configured as an array of motor coils, serves to drive the at least one slide 4. The linear motor drive unit 6 is shown in FIG. 3. The linear motor drive unit 6 is situated in the area of the guide rail 2. The linear motor drive unit 6 comprises a large number of coils 8, arranged in a row, preferably of copper, which can be supplied individually with current. The at least one slide 4 in turn, as can be seen in FIG. 1 among others, comprises at least two permanent magnets 10, which interact with the linear motor drive unit 6. A plurality of guide elements 11, which are preferably rollers, serve to support and guide the slide 4 along the guide rail 2. These rollers are preferably made of plastic.

When a coil 8 is energized, local magnetic fields are created, and thus a force flows between the coil 8 and the permanent magnets 10. Through intelligent activation and energizing of the individual coils 8, a "traveling" magnetic field can be produced, which can move each individual slide 4 independently of the other slides 4. Because of the permanent magnets 10, one of which is arranged next to each of the two sides of the linear motor drive unit 6, the direct effect of the force between each coil 8 and the permanent magnets 10 is theoretically neutralized, and what remains is only a drive force, which acts on each slide 4.

The strongest attractive force is present between the permanent magnets 10 and the stator teeth 12 (see FIG. 3) located between the coils 8. The ferrous stator teeth 12 have the function of increasing the magnetic field density. Theoretically, the linear motor drive unit 6 could also be built without iron, but the achievable drive force would then be not as high.

The at least one slide 4 must be sturdily supported, so that the gap between the coil 8 and the permanent magnets 10 can be kept as constant as possible on both sides. The slide 4 comprises for this purpose a substantially horseshoe-shaped or inverted U-shaped base body 14, from which the guide elements 11 project toward the inside. The at least two permanent magnets 10 are arranged on the inside surface of the base body 14 and enclose the linear motor drive unit 6 in plane-parallel fashion from both sides. Several permanent magnets 10 are preferably provided on each of the two sides of the slide 4.

The guide elements 11 rest on the guide rail 2 and guide the slide 4 on the guide rail 2. The two halves of the slide, i.e., the halves to the right and to the left of the longitudinal center plane in FIG. 1, therefore each comprise three guide elements 11. Fewer or more than three guide elements 11 are also possible, however. In addition to the configuration of the slide 4 shown here, many other shapes and dimensions of the slide 4 are also possible within the scope of the invention.

As can be seen from FIGS. 1-5, the slide 4 comprises in all cases a first subelement 19 and a second subelement 21. The first and second subelements 19, 21 are arranged in series in the conveying direction F of the conveying device. It makes no difference whether the first subelement 19 or the second subelement 21 is in the leading position with respect to the conveying direction F. The second subelement 21 is preferably narrower in the conveying direction F than the first subelement 19.

Only the first subelement 19 usually comprises the guide elements 11, which rest on the guide rail 2, whereas the second subelement 21 has no guide elements 11, nor does it have any other parts which rest on the guide rail 2. In other embodiments, not shown here, it is also conceivable that both the first subelement 19 and the second subelement 21 could comprise guide elements 11, all of which rest on the guide rail 2.

The first subelement 19 and the second subelement 21 are connected to each other by means of at least one connecting element 23 and can move relative to each other in the conveying direction F in linear fashion. In the present exemplary embodiments, the slide 4 comprises four connecting elements 23. It would also be possible, however, for more or fewer than four connecting elements 23 to be present.

The at least one connecting element 23 is preferably connected rigidly to the first subelement 19. The second subelement 21 is connected to the at least one connecting element 23 in such a way that the second subelement 21 is prevented from tilting relative to the first subelement 19 in any direction. In addition, the at least one connecting element 23 serves as a linear guide for the second subelement 21. If several connecting elements 23 per slide 4 are present, these are preferably configured as rods, on which the second subelement 21 is slidingly supported. If only one connecting element 23 is present per slide 4, this element is preferably configured as a plate, so that the second subelement 21 is prevented from tilting sideways. The person skilled in the art will be able to think of many other possibilities for the at least one connecting element 23, however.

The at least one connecting element 23 is preferably accommodated in at least one through-opening 25 in the second subelement 21. In the present embodiment, a through-opening 25 is formed in an upper area and also in a middle area of the two legs 16, 17 of the second subelement 21. Ideally, the through-openings 25 are arranged symmetrically with respect to the longitudinal center plane of the slide 4. Other possible ways in which the connecting elements 23 can be arranged to connect the two subelements 19, 21 together are also conceivable, however.

The permanent magnets 10 are arranged in the lower areas of the first subelement 19 and of the second subelement 21. The at least one permanent magnet 10 of first subelement 19 is always interacting with the coils 8 of the linear motor drive unit 6. As a result, the slide 4 is moved forward. The at least one permanent magnet 10 of the second subelement 21, however, interacts with the coils 8 of the linear motor drive unit 6 only in certain sections. An interaction can occur here only in straight sections of the guide rail 2, but not in curved sections. A shift of the second subelement 21 relative to the first subelement 19 then takes place by means of suitable activation of the coils 8 by means of the control unit 38 and by the action of the magnetic field generated by the coils 8 on the permanent magnets 10 of the second subelement 21. The connecting elements 23 prevent the second subelement 21 from tilting as it is being shifted.

The slide 4 preferably also comprises a spring element 40 (see FIG. 2), which is arranged in such a way that it pretensions the two subelements 19, 21 toward each other. In this way, the second subelement 21 will be pulled toward the first subelement 19 or held against it when there is no interaction between the linear motor drive unit 6 and the permanent magnets 10 of the second subelement 21. There is no interaction, for example, in a curved section of the guide rail 2, in which the second subelement 21 stands off from the guide rail 2.

As can be seen in FIG. 1, the first subelement 19 can also comprise a position detection element 27. Because the second subelement 21 is connected to the first subelement 19 by the at least one connecting element 23, the second subelement 21 does not necessarily have to have a position detection element 27. If a position detection element 27 should also prove necessary on the second subelement 21, it can be attached at any time.

In a middle area of each of the two subelements 19, 21, on the side facing away from the guide rail 2, first and second retaining elements 30, 31 will normally be arranged, which form between them a product holding space for the products 32 to be transported. In the embodiments shown here, each retaining element 30, 31 comprises two legs 33, 34, which are substantially perpendicular to each other, so that each retaining element 30, 31 has substantially the shape of an "L". One leg 33 serves here as a support surface for the products 32. As can be seen from FIGS. 4 and 5, it can be advantageous for the first retaining element 30 on the first subelement 19 to be arranged on the side facing the second subelement 21. The first retaining element 30 on the first subelement 19 can also be arranged on the side facing away from the second subelement 21, see FIG. 3. In this case, the horizontal leg 33 can be longer. Finally, the first retaining element 30 on the first subelement 19 could also be arranged in the middle of the first subelement 19.

The shape, orientation, and dimensions of the retaining elements 30, 31, however, are arbitrary. In particular, it is also possible for an "I" shape to be used. In this case, a surface of each of the two subelements 19, 21 will serve as the support surface for the products 32.

As already mentioned above, the conveying device comprises a control unit 38. The control unit 38 is set up to activate the coils 8 of the linear motor drive unit 6 in such a way that the first subelement 19 and the second subelement 21 can be pushed relative to each other in straight areas of the guide rail 2.

As a result, first, adaptation can be made to the shape or dimensions of the products 32 to be transported. Second, as shown in FIGS. 4 and 5, the first subelement 19 and the second subelement 21 can be moved relative to each other between a holding position and a feed or removal position.

FIG. 4 shows a holding position. In the holding position, the retaining element 30 of the first subelement 19 and the retaining element 31 of the second subelement 21 are a certain distance apart. The size of the gap is selected in such a way that, for example, the products 32 are held firmly between the retaining elements 30, 31. In the feed or removal position, shown in FIG. 5, the retaining element 30 of the first subelement 19 and he retaining element 31 of the second subelement 21 are a second distance apart. The second distance is greater than the first distance, so that the products 32 can be easily introduced between the retaining elements 30, 31 of the two subelements 19, 21 or removed from them.

In the embodiments described above, a product holding space, preferably between two retaining elements 30, 31, is increased or decreased by the relative movement of the subelements 19, 21. The relative shifting of the subelements 19, 21 can also be used to activate other functions or mechanisms or to generate forces in general. For example, a rotation of the surface supporting the packaged goods, the generation of a vacuum, a vertical movement of the support surface, etc., would also be possible.

The invention claimed is:

1. A conveying device for conveying products comprising:
    at least one individually movable slide for holding products;
    a guide rail, on which the at least one slide is guided; and
    a linear motor drive unit for driving the at least one slide,
    wherein the at least one slide comprises a first subelement and a second subelement, the first subelement and the second subelement each comprising at least one permanent magnet, which interacts at least in certain sections of the guide rail with coils of the linear motor drive unit;
    wherein the first subelement and the second subelement are connected to each other by means of at least one connecting element and are movable relative to each other in linear fashion, and wherein the first subelement comprises guide elements, which rest on the guide rail, whereas the second subelement comprises no parts which rest on the guide rail.

2. The conveying device according to claim 1, wherein the at least one connecting element is rigidly connected to the first subelement.

3. The conveying device according to claim 1, wherein the first subelement and the second subelement are connected to the at least one connecting element in such a way that a tilting of the first subelement and of the second subelement relative to each other is prevented.

4. The conveying device according to claim 1, wherein the first subelement and the second subelement are arranged in series in a direction parallel to a longitudinal center plane of the guide rail.

5. The conveying device according to claim 1, further comprising a control unit, which serves to activate the coils of the linear motor drive unit in such a way that the first subelement and the second subelement are moved relative to each other.

6. The conveying device according to claim 1, wherein the first subelement comprises a position detection element.

7. A conveying device for conveying products comprising:
   at least one individually movable slide for holding products;
   a guide rail, on which the at least one slide is guided; and
   a linear motor drive unit for driving the at least one slide,
   wherein the at least one slide comprises a first subelement and a second subelement, the first subelement and the second subelement each comprising at least one permanent magnet, which interacts at least in certain sections of the guide rail with coils of the linear motor drive unit;
   wherein the first subelement and the second subelement are connected to each other by means of at least one connecting element and are movable relative to each other in linear fashion, and wherein the at least one connecting element serves as a linear guide for the second subelement.

8. The conveying device according to claim 7, wherein the first subelement comprises guide elements, which rest on the guide rail, whereas the second subelement comprises no parts which rest on the guide rail.

9. The conveying device according to claim 7, wherein the at least one connecting element is a rod, on which the second subelement is slidingly supported.

10. The conveying device according to claim 7, wherein the at least one connecting element is rigidly connected to the first subelement.

11. The conveying device according to claim 7, wherein the first subelement and the second subelement are connected to the at least one connecting element in such a way that a tilting of the first subelement and of the second subelement relative to each other is prevented.

12. A conveying device for conveying products comprising:
   at least one individually movable slide for holding products;
   a guide rail, on which the at least one slide is guided; and
   a linear motor drive unit for driving the at least one slide,
   wherein the at least one slide comprises a first subelement and a second subelement, the first subelement and the second subelement each comprising at least one permanent magnet, which interacts at least in certain sections of the guide rail with coils of the linear motor drive unit;
   wherein the first subelement and the second subelement are connected to each other by means of at least one connecting element and are movable relative to each other in linear fashion, and wherein the first subelement comprises a first retaining element and the second subelement comprises a second retaining element for forming a product holding space between the first and second retaining elements.

13. The conveying device according to claim 12, wherein the first and second subelements are movable relative to each other between a holding position, in which the first retaining element and the second retaining element are a first distance apart, and a feed or removal position, in which the first retaining element and the second retaining element are a second distance apart, which is greater than the first distance.

14. The conveying device according to claim 12, wherein the first subelement comprises guide elements, which rest on the guide rail, whereas the second subelement comprises no parts which rest on the guide rail.

15. The conveying device according to claim 12, wherein the at least one connecting element is rigidly connected to the first subelement.

16. The conveying device according to claim 12, wherein the first subelement and the second subelement are connected to the at least one connecting element in such a way that a tilting of the first subelement and of the second subelement relative to each other is prevented.

17. A conveying device for conveying products comprising:
   at least one individually movable slide for holding products;
   a guide rail, on which the at least one slide is guided; and
   a linear motor drive unit for driving the at least one slide,
   wherein the at least one slide comprises a first subelement and a second subelement, the first subelement and the second subelement each comprising at least one permanent magnet, which interacts at least in certain sections of the guide rail with coils of the linear motor drive unit;
   wherein the first subelement and the second subelement are connected to each other by means of at least one connecting element and are movable relative to each other in linear fashion, and wherein the at least one slide comprises a spring element, which pretensions the first and second subelements toward each other.

18. The conveying device according to claim 17, wherein the first subelement comprises guide elements, which rest on the guide rail, whereas the second subelement comprises no parts which rest on the guide rail.

19. The conveying device according to claim 17, wherein the at least one connecting element is rigidly connected to the first subelement.

20. The conveying device according to claim 17, wherein the first subelement and the second subelement are connected to the at least one connecting element in such a way that a tilting of the first subelement and of the second subelement relative to each other is prevented.

* * * * *